Figure 1:
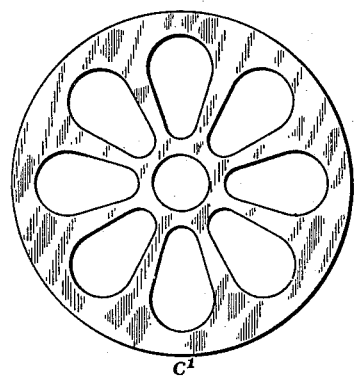

(No Model.)

A. SCHMID.
METHOD OF FORMING CORES FOR ELECTRICAL APPARATUS.

No. 406,859. Patented July 9, 1889.

Witnesses
George Brown Jr.
James Wm. Smith.

By his Attorney

Inventor
ALBERT SCHMID.

UNITED STATES PATENT OFFICE.

ALBERT SCHMID, OF ALLEGHENY, ASSIGNOR TO THE WESTINGHOUSE ELECTRIC COMPANY, OF PITTSBURG, PENNSYLVANIA.

METHOD OF FORMING CORES FOR ELECTRICAL APPARATUS.

SPECIFICATION forming part of Letters Patent No. 406,859, dated July 9, 1889.

Application filed May 13, 1889. Serial No. 310,600. (No model.)

*To all whom it may concern:*

Be it known that I, ALBERT SCHMID, a citizen of the Republic of Switzerland, residing in Allegheny, county of Allegheny, and State of Pennsylvania, have invented a certain new and useful Improvement in Methods of Forming Cores for Electrical Machines, (Case No. 320,) of which the following is a specification.

My invention relates to a method of building up or constructing the cores of electrical apparatus, and it especially relates to the method of building up the armature-cores of electric generators and motors. The invention is, however, applicable to other apparatus, as will be apparent from the following description.

In certain forms of electric generators and motors it is customary to build up the armatures from plates, (sheets or laminæ of soft iron,) and to provide a more or less perfect insulation of the laminæ. Such insulation may be secured by the use of separate sheets or plates of non-conducting substance, or it may be obtained by forming upon the surfaces of the laminæ an oxide of the metal. This may be accomplished by annealing the plates in such a manner as to form a more or less non-conducting oxide over their entire surfaces. I have found that by placing together plates which have been thoroughly annealed after they have been formed into proper shape a sufficient insulation may be secured; but when the surface of an armature thus built is turned down in order to obtain a smooth and true exterior, the edges of the plates are turned over or upset, so that the metal of contiguous plates is brought into contact, thus completing an electrical connection throughout the surface of the core, (the portion where the tendency to establish eddy-currents is very great,) and thus partially defeating the object of the insulation.

My present invention consists, therefore, in first building up an armature by plates of the proper size and shape, then turning it down to remove irregularities and obtain the required dimensions, then taking the armature apart, separating the laminæ from each other, then applying the insulation—as, for instance, by annealing them—and finally reassembling them as before. In this manner the burrs formed upon the edges of the plates by the process of turning the armature down are either reduced or covered with an insulating material—as the oxide of the metal, for instance—and when the plates are reassembled they are separated from each other by the oxide, which affords the required insulation.

The invention is applicable to cores of other apparatus than the armatures of generators and motors, and in fact is applicable to any apparatus requiring insulated laminæ, which is turned off to any given shape or size after the laminæ have been first assembled.

Figure 2:
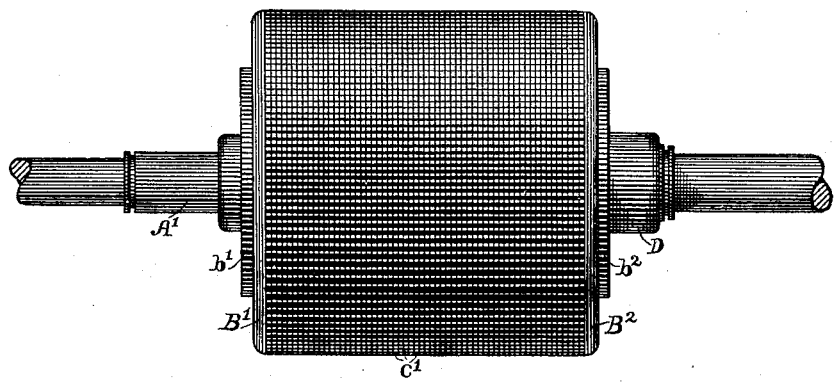

In the accompanying drawings, Figure 1 is a view of the plates of an armature-core. Fig. 2 is a side elevation of an armature-core built of such plates.

Referring to the figures, $A'$ represents an armature-shaft, and $B'$ $B^2$ end plates for the armature-core. The armature may with advantage be constructed with re-enforcing plates $b'$ $b^2$, applied to the plates $B'$ $B^2$. In forming the armature-core sheets or plates of magnetizable material—such, for instance, as soft iron, $c'$—are placed over the shaft and piled upon the plate $B'$. When a sufficient number have been applied to the shaft, they are pressed firmly together by suitable mechanical means, and the end plate $B^2$ and a re-enforcing plate $b^2$ are held in place in any convenient manner, as, for instance, by a nut D turning upon a screw-thread upon the armature-shaft.

In practice it is difficult to cut the plates originally of such exact shape as to cause them to conform when laid together, on account of the tendency to buckle, so that when first laid together they are of approximately the proper size and shape, but usually have slight variations in size or circumference, and therefore it is desirable that the outer surface of the armature be turned down, so that it shall be true and fit exactly and revolve evenly within the field-magnet to which it is to be applied. Therefore it is placed in a suitable lathe and turned in a manner well understood. By this operation, however, a burr or overlapping edge is liable to be formed upon the surfaces of the plates, so that the contiguous plates are to a greater or less extent connected in one continuous electrical circuit. After the armature has been turned off in this manner, therefore, it is taken to pieces, the plates being separated from each other. They are then coated by insulating material. This is preferably accomplished by placing them in a suitable annealing-furnace and bringing them to a proper temperature to reduce the surface of the plate to a non-conducting oxide or a more or less perfectly-insulating oxide of the metal. After this process, which may be accomplished in any convenient well-known manner, the plates are reassembled and the armature is again built up and the plates bound together as before. The armature-core will now be composed of laminæ separated from each other by the required insulation without the intervention of separate sheets or plates of insulating material.

I claim as my invention—

1. The hereinbefore-described method of constructing the laminated cores of electrical apparatus, which consists in building up the core of plates or sheets of magnetizable material, turning the core to the proper shape and form, afterward separating the plates, annealing the same, and finally reassembling them.

2. As a step in the manufacture of laminated cores of electrical apparatus, the turning down of the core to the proper size and shape, taking down the core, annealing the laminæ, and reassembling the same.

3. The herein-described method of constructing the armature-core of an electric machine, which consists in mounting upon the armature-shaft laminæ of magnetizable material, binding them firmly in position, with the faces of consecutive laminæ adjacent to each other in the positions which they are finally to occupy, turning down the core to the proper size and form, dissociating the laminæ, annealing them, and thereby coating their surfaces and edges with an oxide of metal, and finally reassembling the laminæ in approximately the positions formerly occupied thereby, substantially as described.

4. The hereinbefore-described method of constructing the laminated cores of electrical apparatus, which consists in building up the core of plates or sheets of magnetizable material, turning the core to the proper shape and form, afterward separating the plates, oxidizing the same, and finally reassembling the same.

5. The hereinbefore-described method of constructing the laminated cores of electrical apparatus, which consists in building up the core of plates or sheets of magnetizable material, turning the core to the proper shape and form, afterward separating the plates, coating the edges with insulating material, and finally reassembling them.

In testimony whereof I have hereunto subscribed my name this 7th day of May, A. D. 1889.

ALBERT SCHMID.

Witnesses:
J. M. TATE, Jr.,
W. D. UPTEGRAFF.